United States Patent
de Souza Pinto Filho et al.

(10) Patent No.: US 11,788,926 B2
(45) Date of Patent: Oct. 17, 2023

(54) METHOD FOR MONITORING AXIAL LOADS IN STRUCTURES BY IDENTIFYING NATURAL FREQUENCIES

(71) Applicants: BR2W Soluções Ltda., Rio de Janeiro (BR); Universidade Estadual de Campinas—UNICAMP, Campinas (BR)

(72) Inventors: Pedro Luiz de Souza Pinto Filho, Rio de Janeiro (BR); Felliphe Góes Fernandes Barbosa, Rio de Janeiro (BR); Leandro Tadeu Roldão Perestrelo, São Bernardo do Campo (BR); Milton Dias Junior, Campinas (BR); Layse Freitas Boere de Moraes, Campinas (BR)

(73) Assignees: BR2W SOLUCÕES LTDA., Rio de Janeiro (BR); UNIVERSIDADE ESTADUAL DE CAMPINAS—UNICAMP, Campinas (BR)

( * ) Notice: Subject to any disclaimer, the term of this patent is extended or adjusted under 35 U.S.C. 154(b) by 229 days.

(21) Appl. No.: 17/296,144

(22) PCT Filed: Nov. 23, 2018

(86) PCT No.: PCT/BR2018/050437
§ 371 (c)(1),
(2) Date: May 21, 2021

(87) PCT Pub. No.: WO2020/102865
PCT Pub. Date: May 28, 2020

(65) Prior Publication Data
US 2022/0018729 A1 Jan. 20, 2022

(51) Int. Cl.
| G01M 5/00 | (2006.01) |
| G01M 99/00 | (2011.01) |
| G01L 5/04 | (2006.01) |
| G01H 11/08 | (2006.01) |
| G01L 1/16 | (2006.01) |
| G01M 7/00 | (2006.01) |

(52) U.S. Cl.
CPC ........ G01M 5/0058 (2013.01); G01M 5/0066 (2013.01); G01M 99/008 (2013.01)

(58) Field of Classification Search
CPC ............ G01M 99/008; G01M 5/0066; G01M 5/0058; G01M 7/02; G01M 17/04;
(Continued)

(56) References Cited

U.S. PATENT DOCUMENTS

| 5,195,046 A | 3/1993 | Gerardi et al. |
| 5,327,358 A | 7/1994 | Stubbs |

(Continued)

FOREIGN PATENT DOCUMENTS

| BR | PI 0508906 B1 | 8/2007 |
| GB | 2221033 A | 1/1990 |
| GB | 2550192 A | 11/2017 |

OTHER PUBLICATIONS

International Searching Authority, International Search Report and Written Opinion for International Application No. PCT/BR2018/050437, dated Jan. 16, 2019, (15 pages), Instituto Nacional Da Propriedade Industrial, Rio de Janeiro/RJ, Brazil.

(Continued)

*Primary Examiner* — Brandi N Hopkins
(74) *Attorney, Agent, or Firm* — Alston & Bird LLP

(57) ABSTRACT

The present invention relates to a method for monitoring axial loads in structures by identifying natural frequencies. The analyzed structures are made up of elements connected by means of contact and are subjected to tractive loads, such as mooring lines. The proposed method uses bench testing and a computer model of the structure to determine the (Continued)

variation in the natural frequencies in relation to the variation in load. Monitoring is carried out using vibration sensors, in particular accelerometers, laser position sensors or strain gauges, to measure the dynamic behaviour of the structure, a data capture and signal conditioning unit and a computer to correlate the load applied and the vibration behaviour using a computer algorithm, and also to present the result. The invention discloses an easy calibration method for the dimensional template of the structures in question, high accuracy and easy installation and operation in the field.

10 Claims, 4 Drawing Sheets

(58) Field of Classification Search
CPC .......... G01N 3/32; G01N 29/11; G01N 29/46; G01N 3/14; G01N 29/14; B62D 21/152; E02B 17/0017; G01L 5/107; G01B 15/06; G01V 1/00
See application file for complete search history.

(56) References Cited

U.S. PATENT DOCUMENTS

| | | | |
|---|---|---|---|
| 5,533,399 A | 7/1996 | Gibson et al. | |
| 7,080,689 B2* | 7/2006 | Guesnon | E21B 47/001 |
| | | | 702/6 |
| 9,557,212 B2 | 1/2017 | Xia et al. | |
| 9,593,568 B1* | 3/2017 | LeMonds | E21B 47/007 |
| 2006/0065401 A1* | 3/2006 | Allen | E21B 44/00 |
| | | | 166/345 |
| 2007/0006652 A1 | 1/2007 | Weldon, Jr. et al. | |
| 2007/0175639 A1 | 8/2007 | Hoen | |
| 2008/0011091 A1 | 1/2008 | Weldon, Jr. | |
| 2015/0346064 A1* | 12/2015 | Liu | E21B 17/01 |
| | | | 702/188 |

OTHER PUBLICATIONS

Lima, Andre Luiz Ladeira de Sosa. *Análise No Domínio Da Frequência De Linhas De Emharcação Ancorada Em Mar Aleatório*, Doctoral Dissertation, Universidade Federal do Rio de Janeiro, Mar. 2012, (71 pages).

Pereira, Lívia Carvalho Baptista. *Análise da Influência das Tensões Residuals na Vida em Fadiga de Elos Sem Malhete Através do Método de Elementos Finitos*, (Projeto Final de Curso (Bacharelado em Engenharia Mecânica), Centro Federal de Educação Tecnológica Celso Suckow da Fonseca—CEFET, Rio de Janeiro, Jul. 2014, (119 pages).

De Alencar, Rafael Fermando Mendonca. *Análise Experimental Do Efeito Da Sequência De Carregamento Sobre A Resistência A Fadiga De Cabos Condutores De Energia*, Monografia (Bacharelado em Engenharia Mecânica), Universidade de Brasília,UnB, Brasília, Dec. 9, 2011, (84 pages).

* cited by examiner

METHOD FOR MONITORING AXIAL LOADS IN STRUCTURES BY IDENTIFYING NATURAL FREQUENCIES

CROSS REFERENCE TO RELATED APPLICATIONS

This application is a national stage application, filed under 35 U.S.C. § 371, of International Application No. PCT/BR2018/050437, filed Nov. 23, 2018; the contents of which as are hereby incorporated by reference in their entirety.

BACKGROUND

Technical Field

The present invention refers to a method of monitoring axial loads in structures, such as moorings, by identifying their natural frequencies.

Description of Related Art

In the field of engineering, in particular in the field of marine engineering and oil and gas, the emergence of new simple and effective methods for determining mechanical loads to which the structures in question are subjected has been increasingly important.

Moorings are structures made of elements connected through contact and exclusively subjected to traction efforts. Currently, measurement of loads of these structures is done directly, with the aid of load cells, or indirectly, using angle sensors. Solution using load cells makes use of electronic sensors, known as strain gauges, which measure the material (usually steel) deformation from changes in the electrical resistance. Thus, a signal conditioner converts the read signal into millivolts per volts applied to the unit-of-measure load. To start up and monitor the structure, all this apparatus has to be mounted directly on the mooring line.

However, this solution has issues that cause damage during operation. The sudden stop of the equipment involved during operation is not uncommon, thus interrupting the monitoring process and/or reporting inconsistent values. In addition, since the site of installation and operation of the moorings is difficult to access, maintenance of the equipment becomes extremely complicated and unfeasible, in addition to requiring the load on the mooring to be relieved. Therefore, it is often impossible to carry out any repairs or replacements of the damaged cell.

As strain gauges are fragile resistors, they can present defects under the severe operating conditions of the structures to be monitored, which make it impossible for one to calculate the load response by traditional methods of voltage-to-load correlation, as found in load cells.

They can also have issues of sticking on the surface of the load cell, which can also make load measurements unfeasible. In addition, they are sensitive to contaminants and moisture, and there may be errors in reading the deformation of the monitored structure.

Furthermore, due to the stringent environmental conditions in which such structures are inserted, protection against the marine environment is necessary due to the high susceptibility of electronic components to corrosion. Thus, any maintenance due to corrosion or malfunction, or even for checking calibration of equipment, involves a large operation with high risk for accidents, given that it is necessary to disconnect the load from the anchoring line.

Determining the load on the mooring indirectly by measuring its angle is based on a calculation method that takes the position of the anchor on the seabed and the position of the ship into account, both information obtained by GPS with a differential system. With these data, an estimate of the load on the mooring is made using the mathematical model of a catenary. This calculation methodology has uncertainties derived from measurements of the positions of the anchor, ship, and mooring angle, in addition to simplifying hypotheses for the mooring approximation by a catenary mathematical model.

In this context, document US 2008/0011091 is intended to solve all these problems through a system and a method to obtain data relative to stresses and temperature in structural components through the excitation of one or more vibration modes in the structure. Changes in associated resonant frequencies or phases that are caused by changes in the loads and temperature of the structure are detected. In one embodiment of the invention, a model of finite elements is built only to determine the optimal placement of sensors and actuators. However, the solution proposed by US 2008/0011091 has a calibration process with the limitation of requiring a replica of the real structure to be monitored for the calibration process be carried out. Such an issue makes it unfeasible to use the related method in ship moorings, for example, due to their large dimensions and the magnitude of the associated loads. Also, the method takes into account different types of load—radial, bending and axial. Such a goal requires an extremely laborious calibration process, since, to build the calibration chart, it is necessary to apply each of the loads described above to the structure separately—each load being applied at different load levels —, in addition to multiple load combinations that may exist. In the end, there is a calibration table with all the tested scenarios, namely: different load values, different types of load and different temperatures, that is, there is extensive data collection.

Despite all this work, it is possible that, in a real situation, the load applied to the structure is different from all scenarios tested in the process of preparing the calibration chart, hence hindering the process of relating the dynamic behavior of the system to the load applied to the structure. The solution proposed by US 2008/0011091 further requires, obligatorily, phase and temperature information, making the method even more laborious and increasing the difficulty of implementation.

Document US 2008/0011091 further states that it is possible to obtain the loading levels to which the structure is subjected—considering as loading any axial, radial, bending, torsion and thermal loads, and any combination between them—just by calculating the variation of natural frequencies, phase and temperature obtained through measurements carried out at some points of the structure. The fact is that the proposed relationship is not unique in the sense that:

1. if the loading applied to the structure is defined, the deformation pattern of the system is also uniquely established, as well as its natural frequencies (surjective function); and
2. however, a certain variation in natural frequencies can be caused not only by one, but by more than one distinct set of loads (multivalued function).

These characteristics cause a severe compromise in quality of the calculation of each load applied to the structure.

BRIEF SUMMARY

The purpose of the present invention is to analyze the vibrational response of structures exclusively subjected to axial stress load by means of vibration sensors, therefore, identifying the natural frequencies of such structures in order to identify the load to which the structure is being subjected. Through a model of finite elements whose construction and adjustment is by using a calibration prototype smaller than the real structure, such as a mooring with less links, it is possible to create a reliable computational model capable of predicting the vibratory behavior of the real mooring, making it possible for one to monitor the applied load.

The proposed system is easy to calibrate, requiring the monitoring of only one type of load—i.e., axial load, in a prototype smaller than the real structure. Temperature or phase observance is not required. With the creation of the computational model, it is not necessary to use the real structure at the time of calibration and mapping of the relationship between vibration and load.

The invention is intended to provide better resolution than the previously cited methods and to solve issues of difficulty in maintenance.

As the sensors are installed superficially on the structure, which can be magnetically, with wax, glue, among others, their exchange or removal is easy and simple, especially when compared to the traditional load cell solution.

The invention is also intended to present a simpler and more versatile solution. The present solution eliminates the need to acquire an extensive calibration table through tests carried out on the real structure with different types of load being applied.

BRIEF DESCRIPTION OF THE FIGURES

The present invention will now be described in more detail based on the drawings. The figures show.

DETAILED DESCRIPTION OF VARIOUS EMBODIMENTS

It is widely known in the state of the art that natural frequencies of a structure vary according to the state of stresses present therein. A very emblematic case of this phenomenon is the tuning of the strings of a guitar, in which applying tension on them generates a higher note. Similarly, a relaxation translates into a lower note.

Figure 1:
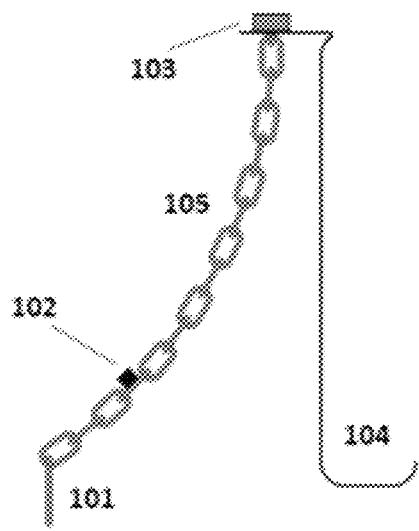
FIG. 1—is an example of the measurement process as widely known from the prior art.

The present invention makes use of this relationship between loading and vibration pattern to identify loads on moorings, by observing their vibrational responses under different loads. FIG. 1 exemplifies a common situation in the state of the art of measuring the load on moorings 105 using widely known components. On the right is the vessel 104, on the left is an anchor 101 and between them is the mooring 105. A load cell 103 is at the end of the mooring 105 which is secured to the vessel 104 and an angle sensor 102 at a predetermined position along the mooring 105.

As noted in the previous sections, monitoring of moorings as it is commonly done has a number of disadvantages.

Figure 2:
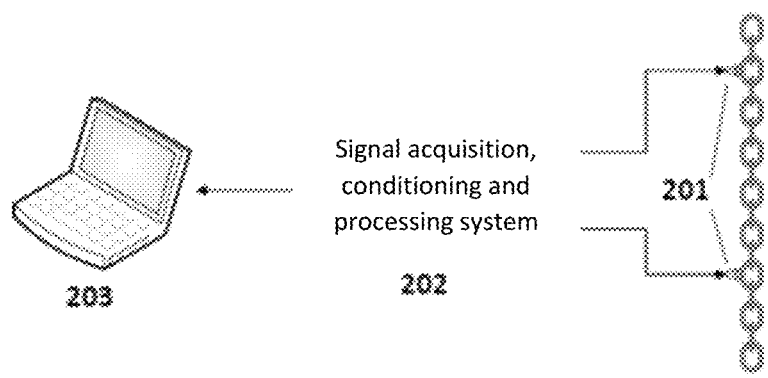
FIG. 2—is a diagram of the components required to carry out measurements and display the measured load.

As seen in FIG. 2, data collected by the sensors 201 are forwarded to a signal acquisition, conditioning and processing unit 202 so that the results be analyzed in a computer 203.

Figure 3:
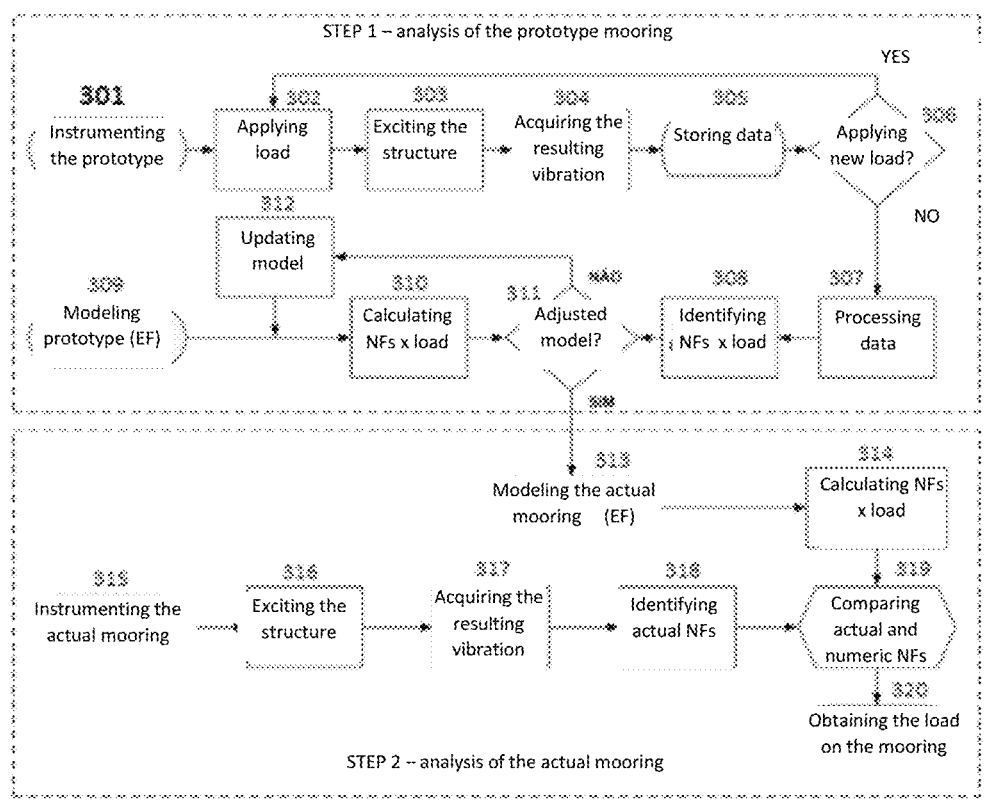
FIG. 3—is a flowchart with all operations performed in the process.

The flowchart illustrated in FIG. 3 presents the steps to implement the proposed method.

Step 1—Analysis of the Prototype Mooring

In step 301, a bench test is carried out with a prototype consisting of a fraction of the real mooring, that is, a mooring with less links, designated as test mooring. In this step, vibration measurement sensors, especially accelerometers, are placed along the structure, where each sensor will measure the vibration at the point of placement on the three spatial directions.

The prototype must be tensioned in step 302 according to a pre-established value and then, in step 303, vibration is caused. The system can be excited by the impact of a hammer, sledgehammer or similar object, and sensors arranged on the test mooring capture the responses at each point of the prototype.

Then, in step 304, acceleration data, or other signal, is collected by means of a data acquisition module, as illustrated in FIG. 2, and, in step 305, it is saved in a computer.

In step 306, if necessary, steps 302 to 305 are repeated for loads of different magnitudes, that is, tension on the test mooring is changed and new measurements are taken.

In step 307, the collected data is processed in a computer determining the frequency domain response. Thus, in step 308 natural frequencies of the structure are related to each applied load, in addition to the dampening characteristics of the structure and the hysteresis curves of the test mooring.

In order to model the test mooring prototype with a reduced number of links in step 309, a computational model of the prototype is developed and analyzed in steps 301 to 305. Preferably, a 3D modeling CAD (Computer Aided Design) software is used to model the test mooring prototype.

Preferably, a CAE (Computer Aided Engineering) software of analysis of finite elements is used, in which the constitutive properties of the prototype material (usually steel) are entered as well as the boundary conditions, the same load to which the prototype was subjected in the bench test and an initial value for the friction index between the links.

A modal analysis is performed for the model and the natural frequencies for each load are calculated in step 310.

In step 311, the frequency response obtained in the analysis of the computational model is compared with the response achieved by the bench test and, in step 312, the model is updated by adjusting the computational model until convergence of the vibrational results, hence validating the computational model.

Step 2—Analysis of the Actual Mooring

In step 313, the reduced test mooring model is extrapolated to a larger number of links in order to model the actual mooring.

In step 314, a computational modal analysis is performed for different load magnitudes, thus obtaining the natural frequencies associated with each case where the actual mooring is subjected to each of the pre-established loads.

At the end of this process, a calibration chart is achieved that relates the axial load values with the respective natural frequency values of the actual mooring.

With the computational model ready, there still remains to instrument the actual mooring.

In step 315, sensors, preferably accelerometers, are placed along the structure of the actual mooring and the wind and/or sea forces themselves are used to excite the system in step 316. A hammer, mallet or similar object can also be used to excite the system and obtain its vibrational behavior. Inertial actuators physically coupled to the mooring can also be used, which are capable of applying to the structure an infinite number of types of excitation forces. Other types of actuators can be used, although not mandatory.

In step 317, acceleration data, or other signal, is collected via a data acquisition module. Then, in step 318, the collected data is processed in a computer by calculating the response in the frequency domain in order to assess peaks and identify natural frequencies. After the natural frequencies are identified, they are compared, in step 319, with the numerical ones obtained via the computational model.

In the simplest possibility of analysis, determination of the load applied to the actual mooring is made by correlating a single natural frequency with the results present in the calibration chart specifically generated for such a mooring The choice of natural frequency to be used in identifying the load intensity is based on sensitivity criteria for each of the natural frequencies relative to the applied load.

If the actual load is within two load limits measured in the mathematical model, a linear interpolation calculation is performed to estimate the load value in step 320, finally displaying the result on a monitor to the user.

Figure 4:
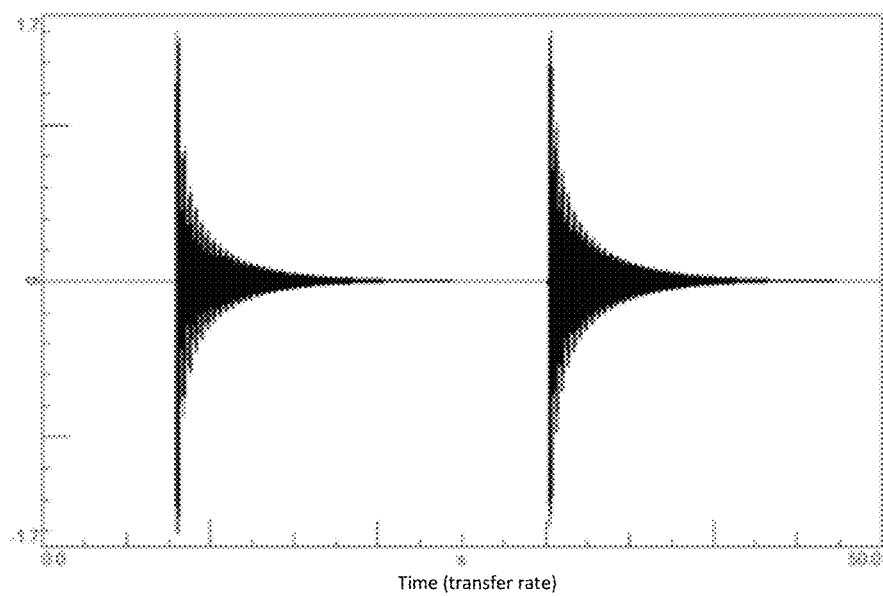
FIG. 4—is an example of measuring accelerometers.

FIG. 4 shows a plot illustrating the shape of a time signal response from the moment the system is excited by impact to its rest. Such response indicates the presence of dampening of the system, which is inherent to the structure.

Figure 5:
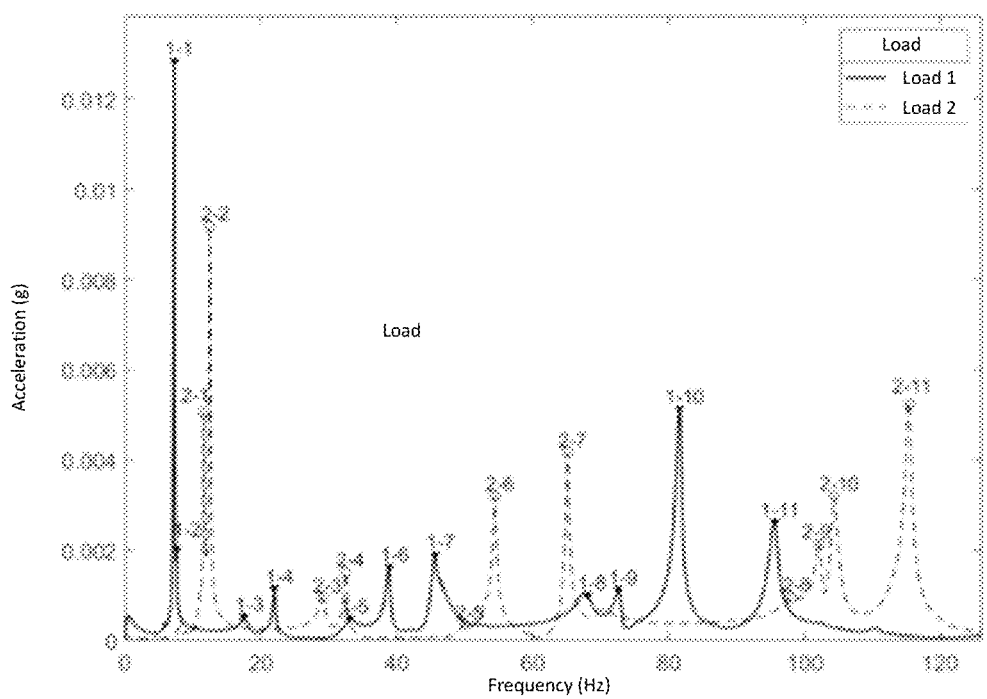
FIG. 5—is an example of response in the frequency domain structure for two different loads.
Figure 6:
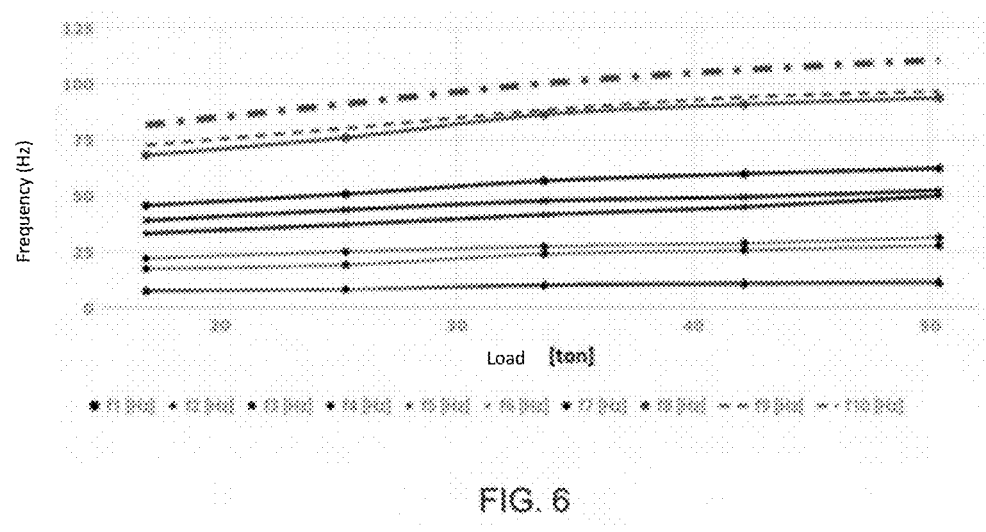
FIG. 6—is an example of variation in the value of natural frequencies due to load variation.

FIG. 5 exemplifies a frequency response for two loads, where in load 2 is greater than load 1. As can be seen, as the load increases, location of the peaks undergoes an increase in frequency, with a change in the natural frequency of the moorings. For example, spot 1-1 on the first peak of the first load is at a lower frequency than corresponding spot 2-1 on the first peak of the second load. FIG. 6 represents the variation in the values of natural frequencies due to load variation, where f1 represents the frequency on the first peak, f2 the frequency on the second peak, and so on.

In one embodiment of the invention, the mooring is excited by environmental forces, such as wind and sea waves. The vibrational response generated is measured by accelerometers and/or sensors that can capture the frequency response, such as strain gauges and position sensors. These data is acquired by an acquisition module to be saved and processed in a computer 203.

Any type of ambient vibration can be used to excite the structures during their operation and/or bench calibration. In addition, the impact of a hammer, mallet or similar object can also be used to excite the system, so the use any type of actuator is unnecessary (although being possible).

In another embodiment of the invention, monitoring can be performed using strain gauges, mainly by reusing those mounted on already installed, defective load cells. That is, if it is verified that strain gauges are providing a satisfactory response for a vibrational analysis, they can be used by the method of the present invention.

Another monitoring possibility is by using laser position sensors.

Inertial actuators physically coupled to the mooring can also be used, which are capable of applying an infinite number of types of excitation forces to the structure. Sinusoidal scanning, for example, is an excellent solution to excite the mooring natural frequencies.

In the simplest possibility of analysis, determination of the load is made by correlating a single natural frequency with the results present in the calibration chart specifically generated for said mooring. The choice of natural frequency to be used in identifying the load intensity is based on sensitivity criteria for each of the natural frequencies relative to the applied load.

In another possible analysis, several natural frequencies are used simultaneously to determine the load applied to the mooring. In this case, a correlation is made of the natural frequencies with the results present in the calibration chart specifically generated for said mooring. Neural network algorithms can be used to determine the load applied to the mooring.

Another embodiment provides the use of genetic algorithms or fuzzy logic to correlate various natural frequencies estimated through field measurements with the results present in the calibration chart specifically generated for said mooring. Response of these algorithms makes it possible to determine the load applied to the mooring with a high level of confidence.

More comprehensively, it is possible to use any artificial intelligence algorithm to process data from the computational model and measurements to determine the load applied to the mooring.

The invention claimed is:

1. A method of monitoring axial loads in structures through the identification of natural frequencies, the method comprising the steps of: arranging measurement sensors (201) on a test mooring comprising at least three links; connecting said sensors (201) to a signal acquisition, conditioning, and processing unit (202); tensioning and exciting the test mooring; collecting vibration data from the test mooring by means of said sensors (201); identifying natural frequencies of the test mooring based on the collected data; developing a load monitoring model based on mechanical characteristics of the test mooring; performing modal analysis of the load monitoring model to determine the natural frequencies of the model; comparing the natural frequencies of the test mooring calculated based on the collected data with the natural frequencies obtained by the load monitoring model; adjusting the load monitoring model until said natural frequencies obtained by the load monitoring model are equal to the natural frequencies of the test mooring; extrapolating the load monitoring model by increasing the number of links in the test mooring; generating a calibration chart via modal analysis for different loads; placing vibration measurement sensors (201) along an actual mooring (105); exciting the actual mooring (105); conditioning the data obtained by said measurement sensors (201) by means of a signal acquisition, conditioning, and processing unit (202); transforming data obtained by said measurement sensors from a time domain to a frequency domain for determining the natural frequencies of the mooring; analyzing the natural frequencies and determining a vibrational profile achieved by the load monitoring model that is most similar to the vibrational profile of the mooring and its equivalent load; and displaying the equivalent load value on a monitor (203).

2. The method according to claim 1, wherein a exciting forces used to determine the natural frequencies of the actual mooring (105) are from at least one of: environmental conditions, impact of a hammer, or an inertial exciter.

3. The method according to claim 2, wherein, to determine the load applied to the actual mooring (105), one of the following is used: neural network algorithms, genetic algorithms, fuzzy logic algorithms, or intelligence artificial algorithms.

4. The method according to claim 1, wherein strain gauges or load cells (103) already installed on the actual mooring (105) are reused to measure vibration of the actual mooring and to estimate the load to which the actual mooring is subjected.

5. The method according to claim 4, wherein, to determine the load applied to the actual mooring (105), one of the following is used: neural network algorithms, genetic algorithms, fuzzy logic algorithms, or intelligence artificial algorithms.

6. The method according to claim 1, wherein position sensors are used to measure the actual mooring (105) and estimate the load to which the actual mooring is subjected.

7. The method according to claim 6, wherein, to determine the load applied to the actual mooring (105), one of the following is used: neural network algorithms, genetic algorithms, fuzzy logic algorithms, or intelligence artificial algorithms.

8. The method according to claim 1, wherein determination of the load applied to the actual mooring (105) is made by correlating a single natural frequency with a results present in a calibration chart specifically generated for the actual mooring (105).

9. The method according to claim 8, wherein, to determine the load applied to the actual mooring (105), one of the following is used: neural network algorithms, genetic algorithms, fuzzy logic algorithms, or intelligence artificial algorithms.

10. The method according to claim 1, wherein, to determine the load applied to the actual mooring (105), one of the following is used: neural network algorithms, genetic algorithms, fuzzy logic algorithms, or intelligence artificial algorithms.

* * * * *